United States Patent
Ikeda

(10) Patent No.: US 6,788,339 B1
(45) Date of Patent: Sep. 7, 2004

(54) IMAGE PICKUP APPARATUS

(75) Inventor: Eiichiro Ikeda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/218,375

(22) Filed: Dec. 21, 1998

(30) Foreign Application Priority Data

Dec. 25, 1997 (JP) .............................................. 9-357388

(51) Int. Cl.$^7$ ................................................. H04N 9/73
(52) U.S. Cl. .................................................. 348/223.1
(58) Field of Search .............................. 348/188, 223.1, 348/350, 655, 279, 230.1, 207.2

(56) References Cited

U.S. PATENT DOCUMENTS

| | | | | |
|---|---|---|---|---|
| 5,262,848 A | * | 11/1993 | Kim ............................ | 348/603 |
| 5,485,202 A | * | 1/1996 | Ueda ......................... | 348/223.1 |
| 5,530,474 A | * | 6/1996 | Takei ......................... | 348/224.1 |
| 5,581,298 A | * | 12/1996 | Sasaki et al. ............. | 348/223.1 |
| 5,654,753 A | * | 8/1997 | Takei ......................... | 348/223.1 |
| 5,659,357 A | * | 8/1997 | Miyano ..................... | 348/222.1 |
| 6,160,579 A | * | 12/2000 | Shiraiwa et al. .......... | 348/224.1 |
| 6,522,353 B1 | * | 2/2003 | Saito et al. ............... | 348/223.1 |
| 6,549,239 B1 | * | 4/2003 | Tao ............................ | 348/371 |

* cited by examiner

Primary Examiner—Wendy R. Garber
Assistant Examiner—Matthew L Rosendale
(74) Attorney, Agent, or Firm—Robin, Blecker & Daley

(57) ABSTRACT

An image pickup apparatus is capable of accurately performing white balance control by accurately detecting color temperature without depending on a luminance signal level. In the image pickup apparatus, a color evaluation value is obtained by computation from color signals coming from a plurality of pixels of an image sensor having complementary color filters. It is determined whether the color evaluation value is included within a white determining range. The white determining range is made to vary according to the shooting condition and/or the object condition. The white balance is adjusted on the basis of color signals having color evaluation values included within the white determining range.

35 Claims, 11 Drawing Sheets

NORMAL LIGHT

FLASH LIGHT

SHUTTER SPEED

F I G. 1
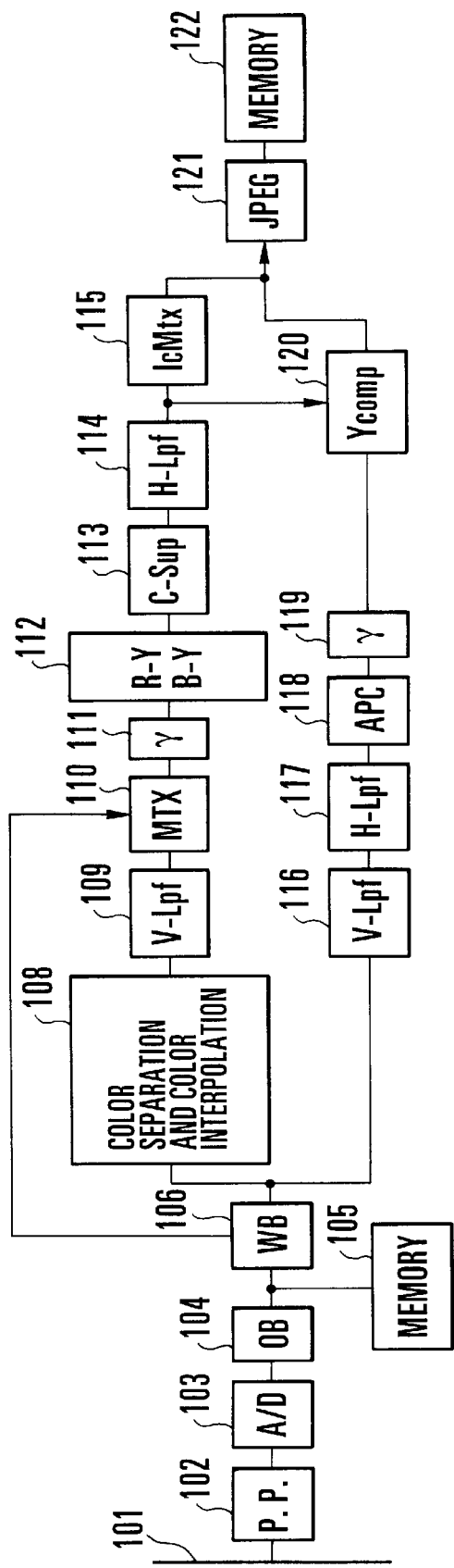

| Ma | G |
| Cy | Ye |
| G | Ma |
| Cy | Ye |

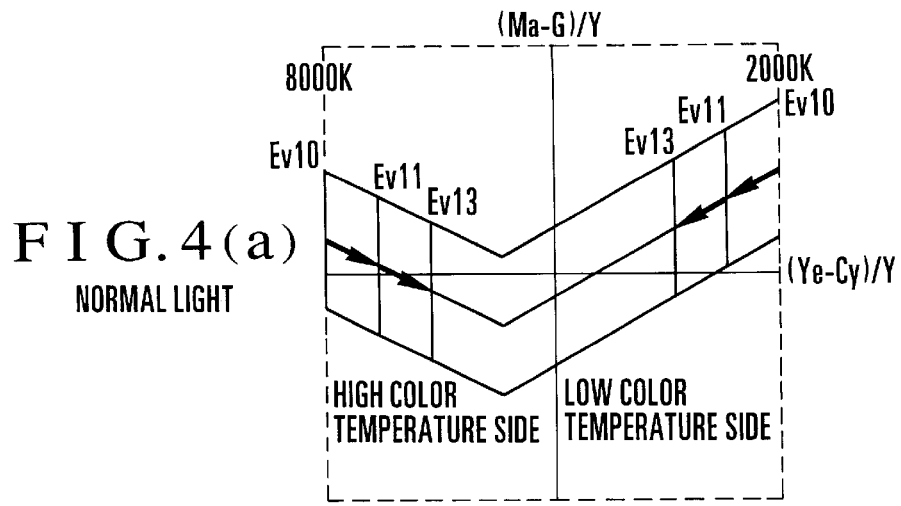
FIG. 4(a) NORMAL LIGHT
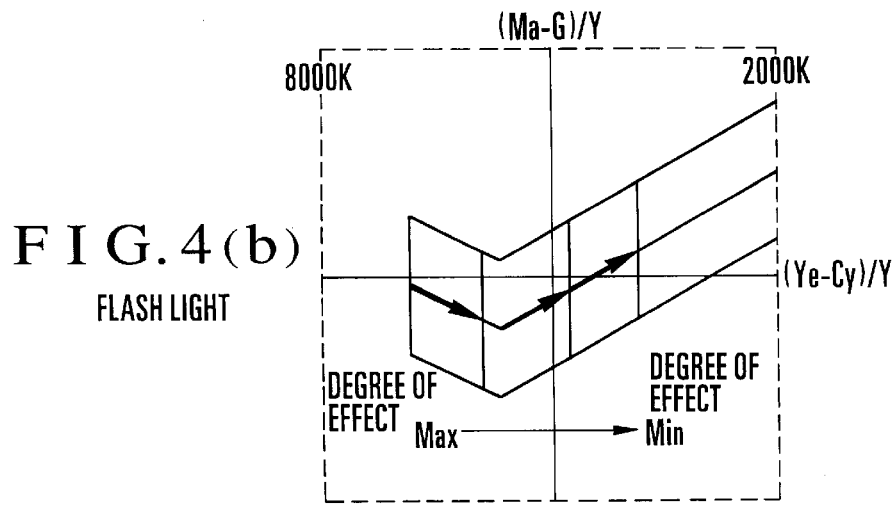
FIG. 4(b) FLASH LIGHT
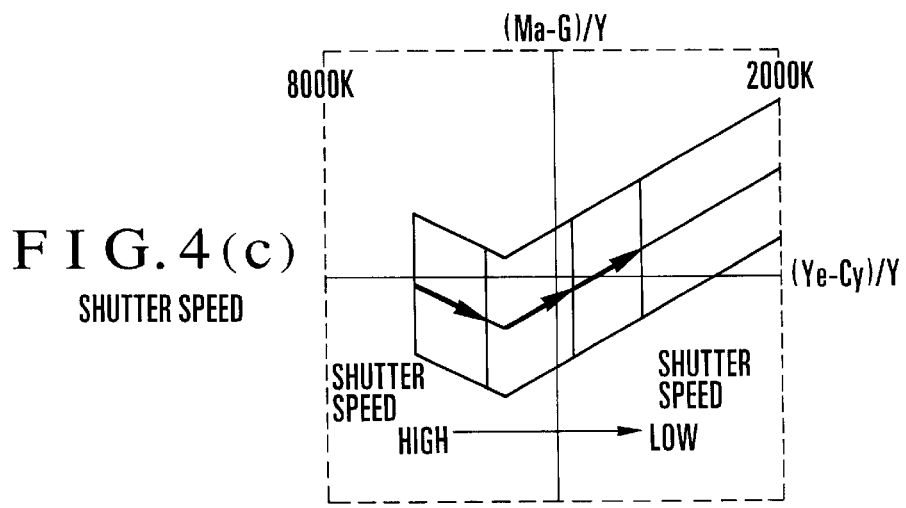
FIG. 4(c) SHUTTER SPEED

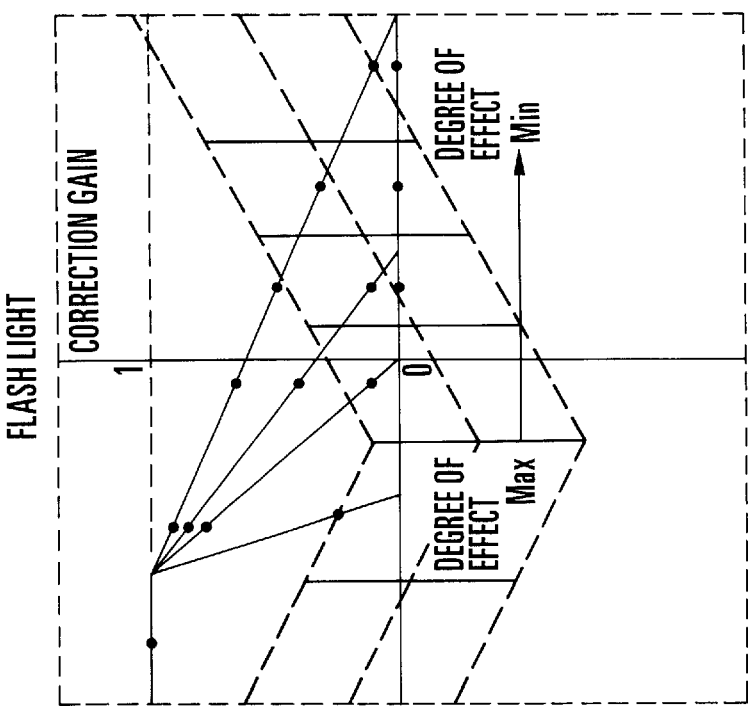
F I G. 6 (b)
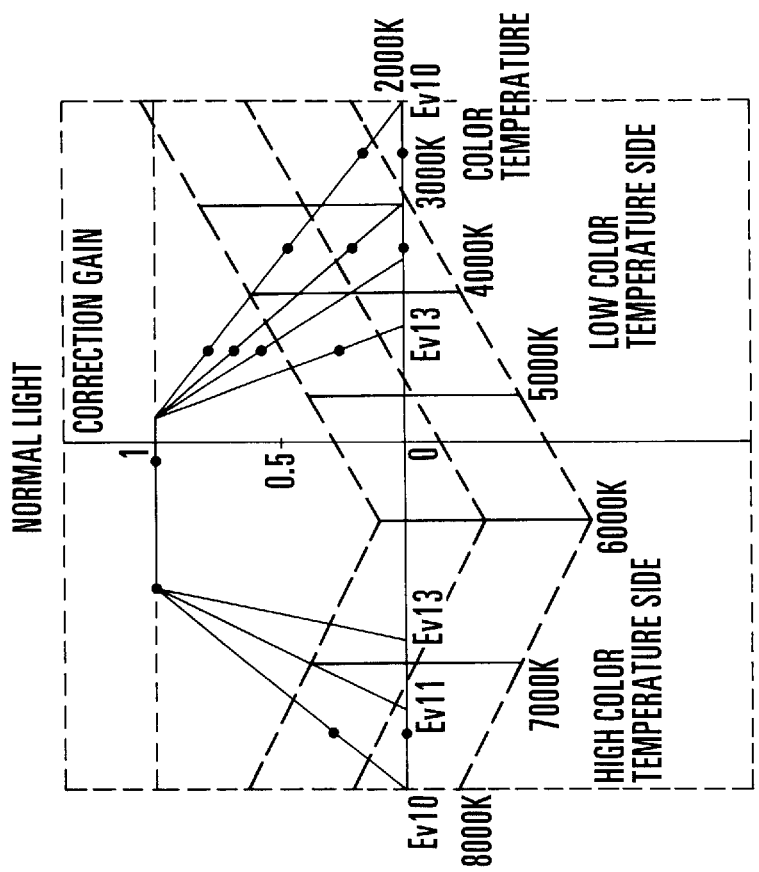
F I G. 6 (a)

FIG. 12
PRIOR ART

ONE PICTURE

| 1 | 2 | 3 | ... | | |
|---|---|---|---|---|---|
| | | | | | |
| | | | | | |
| | | | | | |
| | | | ... | m-1 | m |

SAMPLE AREA

| Ma | G | ... |
|----|----|-----|
| Cy | Ye | ... |
| G | Ma | ... |
| Cy | Ye | ... |
| ⋮ | ⋮ | |

SAMPLE POINT

IMAGE PICKUP APPARATUS

BACKGROUND OF THE INVENTION

1. Field of the Invention

The present invention relates to an image pickup apparatus having an image sensor which is provided with color filters, and more particularly to an image pickup apparatus having an improved signal processing for white-balance adjustment.

2. Description of Related Art

FIG. 10 shows in a block diagram the signal processing system of a conventional single-plate type image pickup apparatus. In this case, the image pickup apparatus is assumed to be provided with complementary color filters having such an arrangement as shown in FIG. 2.

Referring to FIG. 10, an analog image signal outputted from an image sensor 401 is supplied through a preprocessing circuit 402 to an A/D converting circuit 403, where the analog signal is converted into a digital signal. The black level of the digital signal is uniformalized by an OB circuit 404 and is then temporarily stored in a memory 405. It is to be noted that the digital signal as mentioned above is composed of signals Wr, Wb, Gr and Gb obtained by performing a generalized addition read-out on the image sensor 401 and adding together respective signals corresponding to color filters Ma, G, Cy and Ye.

The image signal read out from the memory 405 is gain-adjusted by a pixel gain adjusting circuit 406 according to a gain adjustment value obtained from a white balance circuit 420. The gain-adjusted image signal from the pixel gain adjusting circuit 406 is sent to a color-separation and color-interpolation circuit 407, where the image signal is then sent out as signals Wr, Wb, Gr and Gb to a color processing part situated at the next stage, and at the same time, the gain-adjusted image signal from the pixel gain adjusting circuit 406 is also sent to a luminance processing part without altering the arrangment of signals read out from the image sensor 401.

At the color processing part, the output of the color-separation and color-interpolation circuit 407 is sent to a vertical low-pass filter circuit 408. The output of the vertical low-pass filter circuit 408 is sent to a matrix circuit 409 to be converted into color signals R, G and B. The color signals R, G and B thus obtained are sent to a horizontal low-pass filter circuit 410 to have their frequency band restricted. The output of the horizontal low-pass filter circuit 410 is sent to a gamma converting circuit 411 to be subjected to a gamma correcting process. The output of the gamma converting circuit 411 is sent to a pure-color color-difference converting circuit 412 to be converted into a signal Y and color-difference signals R-Y and B-Y. These color-difference signals R-Y and B-Y are sent to the white balance circuit 420 and a C-SUP circuit 413. At the C-SUP circuit 413, the color-difference signals R-Y and B-Y are subjected to a process of killing the color of their saturated areas. The output of the C-SUP circuit 413 is sent to a Y compensating circuit 419, and is also sent to a color compensating circuit 414, which then performs fine color adjustment.

On the other hand, at the luminance processing part, the output of the pixel gain adjusting circuit 405 is processed to correct a difference in luminance brought about by the color filters. This process is carried out through a vertical low-pass filter circuit 415 and a horizontal low-pass filter circuit 416. Then, an edge emphasizing process is performed on the output of the horizontal low-pass filter circuit 416 by a luminance aperture correcting (APC) circuit 417. The output of the APC circuit 417 is sent to a gamma correcting circuit 418 to be subjected to a gamma correction process. A luminance signal thus obtained is sent from the gamma correcting circuit 418 to the Y compensating circuit 419 to have its luminance finely adjusted by using the color-difference signals sent from the C-SUP circuit 413.

The color-difference signals processed by the color processing part and the luminance signal processed by the luminance processing part are temporarily stored in a memory 423. In a case where the image sensor 401 is subjected to the field reading, the field signals are added together into one frame signal by an addition circuit 421. The frame signal is sent to a compressing circuit 422 to be compressed in accordance with the JPEG system or the like and, after that, is recorded in a flash memory or the like.

The white balance circuit 420 has a clipping circuit for receiving the color-difference signals R-Y and B-Y and for limiting inputs having a large amplitude exceeding a predetermined value with respect to the amplitude of the received color-difference signals R-Y and B-Y. The white balance circuit 420 is controlled by a system control CPU to adjust the gain of output values of the image sensor 401 as follows. While one picture is divided into a plurality of blocks, the color-difference signals and the luminance signal which have passed through the clipping circuit are integrated for each of the divided blocks. Then, in a coordinate system formed by the color-difference signals R-Y and B-Y as shown in FIG. 11, a color-temperature varying range of white color is set as a white determining range 501 on the coordinate system. It is determined whether the integrated value obtained at each of the above-stated blocks is within the white determining range 501 on the coordinate system. Then, gains for the R signal and the B signal are decided by using the integrated values which are within the white determining range 501. From the gains, a gain control value for control over the output of the image sensor 401 is obtained. Thus, the gain of output values of the image sensor 401 is adjusted on the basis of the gain control value.

In an image pickup apparatus using a conventional white balance adjusting method in which a white determining range is set on a coordinate system formed by the color difference signals R-Y and B-Y and an integrated value included within the white determining range is used for white balance adjustment, as mentioned above, if the area of an object of red system of low saturation is large at the time of photography under illumination of high color temperature, the illumination of high color temperature would be misjudged as illumination of low color temperature, because the object of red system of low saturation is included in the same area as that of white of low color temperature in the white determining range. Similarly, if the area of an object of blue system of low saturation is large at the time of photography under illumination of low color temperature, the illumination of low color temperature would be misjudged as illumination of high color temperature, because the object of blue system of low saturation is included in the same area as that of white of high color temperature in the white determining range.

Further, in the conventional white balance adjusting method, any color evaluation value that is not included within the white determining range is not used. Otherwise, the color evaluation value that is not included within the white determining range is replaced with the value of an edge part of the white determining range located nearest to that color evaluation value, and the thus-obtained value is integrated as a new color evaluation value. This arrangement necessitates the image pickup apparatus to be provided with an additional computing circuit.

Further, in a case where the conventional image pickup apparatus uses an image sensor which is provided with complementary color filters, the color reproducibility would degrade unless a matrix arithmetic operation is performed in an optimum manner according to color temperature in converting the image signal after white balance adjustment into a pure color signal through the matrix arithmetic operation.

According to the conventional arrangement, the color evaluation value varies with the method of reading from the image sensor. Therefore, it has been necessary to set the white determining range for one method separately from the range set for another method. For example, with the image sensor having the complementary color filters arranged as shown in FIG. 2, the color evaluation value to be used is a value expressed as (R-Y, B-Y) or (((Wr−Gb)−(Wb−Gr))/(Wr+Gb), ((Wr−Gb)+(Wb−Gr))/(Wb+Gr)) in the case of addition read-out, and is a value expressed as ((Ye−Cy)/Y1, (Ma−G)/Y1) in the case of non-addition read-out. Thus, there exist a plurality of color evaluation values, which necessitate a plurality of white determining ranges to be prepared.

Further, according to the arrangement of the conventional image pickup apparatus described, if the output of the image sensor is inputted to the white balance adjusting part as it is, the number of sample points might become too small in the event of an image having many edges. Besides, in that event, these edges might be misjudged to be white in color. Under such a condition, accurate white detection is impossible.

BRIEF SUMMARY OF THE INVENTION

In view of the above-stated problems, it is a general object of the invention to provide an image pickup apparatus which is capable of accurately detecting color temperature independently of the level of a luminance signal, appositely performing white balance control and reproducing colors in an optimum manner.

To attain the above object, in accordance with an aspect of the invention, there is provided an image pickup apparatus, which comprise an image sensor having a plurality of kinds of color filters, color signal evaluating means for evaluating a color signal outputted from the image sensor, determining means for determining whether the color signal evaluated by the color signal evaluating means is included within a predetermined evaluation range, white balance adjusting means for adjusting white balance on the basis of the color signal determined by the determining means to be included within the predetermined evaluation range, and varying means for varying the evaluation range of the determining means according to a predetermined condition.

In accordance with another aspect of the invention, there is provided an image pickup apparatus, which comprises an image sensor having a plurality of kinds of color filters, first color signal evaluating means for evaluating a color signal outputted from the image sensor, first determining means for determining whether the color signal evaluated by the first color signal evaluating means is included within a predetermined evaluation range, first arithmetic operation means for performing an arithmetic operation to obtain a first control signal on the basis of the color signal determined by the first determining means to be included within the predetermined evaluation range, second color signal evaluating means for dividing a signal for one picture outputted from the image sensor into a plurality of areas, averaging color signals obtained in each of the divided areas and evaluating the averaged color signals, second determining means for determining whether each of the color signals evaluated by the second color signal evaluating means is included within the predetermined evaluation range, second arithmetic operation means for performing an arithmetic operation to obtain a second control signal on the basis of the color signals determined by the second determining means to be included within the predetermined evaluation range, and white balance adjusting means for adjusting white balance on the basis of the first control signal and the second control signal.

In accordance with a further aspect of the invention, there is provided an image pickup apparatus, which comprises an image sensor having a plurality of kinds of color filters, color signal evaluating means for evaluating a color signal outputted from the image sensor, determining means for determining whether the color signal evaluated by the color signal evaluating means is included within one of a plurality of evaluation ranges, weighted-correction means for, if the color signal is determined by the determining means to be included within one of the plurality of evaluation ranges, performing a weighted correction on the color signal according to the evaluation range within which the color signal is included, and white balance adjusting means for adjusting white balance on the basis of the color signal corrected by the weighted-correction means.

The above and other objects and features of the invention will become apparent from the following detailed description of preferred embodiments thereof taken in connection with the accompanying drawings.

BRIEF DESCRIPTION OF THE SEVERAL VIEWS OF THE DRAWING

FIG. 1 is a block diagram showing the structure of the signal processing system of an image pickup apparatus according to a first embodiment of the invention.

FIGS. 4(a), 4(b) and 4(c) are diagrams for explaining the shifting of the white determining range in the first embodiment.

FIGS. 6(a) and 6(b) are diagrams for explaining the graphs of correction gains relative to color temperature and the weighting of the white determining range in the third embodiment.

FIG. 12 is a conceptual diagram showing the structure of pixels for one picture in each of the embodiments of the invention.

DETAILED DESCRIPTION OF THE INVENTION

Hereinafter, preferred embodiments of the invention will be described in detail with reference to the drawings.

First Embodiment

Figures 2, 3:
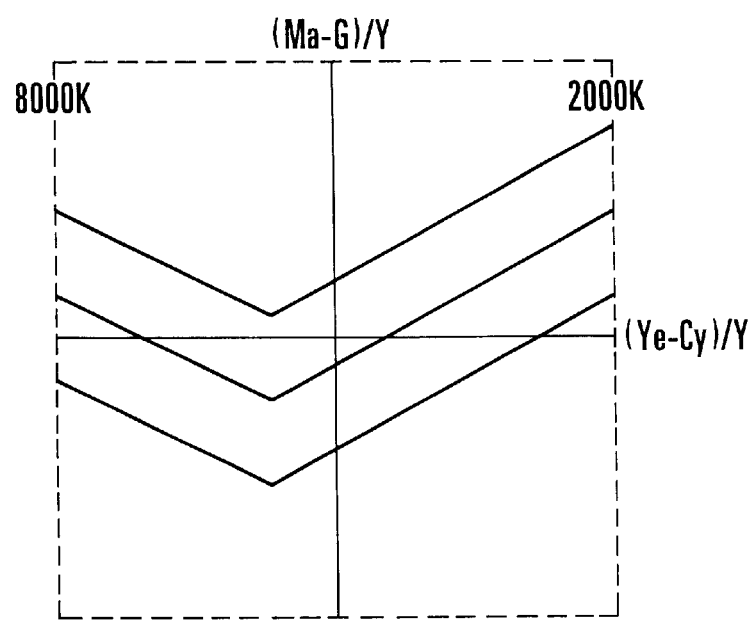
FIG. 2 is a diagram for explaining an example of arrangement of color filters.
FIG. 3 is a diagram for explaining a white determining range in the first embodiment.

FIG. 1 is a block diagram showing the structure of the signal processing system of an image pickup apparatus according to a first embodiment of the invention. In this embodiment, an image sensor 101 of the image pickup apparatus is assumed to be provided with complementary color filters having such an arrangement as shown in FIG. 2.

An analog image signal outputted from the image sensor 101 is supplied through a preprocessing circuit 102 to an A/D converting circuit 103, where the analog signal is converted into a digital signal. The black level of the digital signal is uniformalized by an OB circuit 104 and is then temporarily stored in a memory 105. The digital signal read out from the memory 105 is sent to a white balance circuit 106 to have its color signal gain adjusted according to a gain adjustment value determined in a manner as will be described later. The output of the white balance circuit 106 is sent to a color-separation and color-interpolation circuit 108. Then, four signals of colors Ma, G, Cy and Ye are simultaneously sent to a color processing part. Meanwhile, to a luminance processing part, signals having the same arrangement as the filter arrangement of the image sensor 101 are sent.

In the color processing part, the band in the vertical direction of each input signal is limited by a vertical low-pass filter circuit 109. The output of the vertical low-pass filter circuit 109 is sent to a matrix circuit 110 to be converted into color signals of colors R, G and B. The R, G and B signals are sent to a gamma converting circuit 111 to be subjected to a gamma correction process. The output of the gamma converting circuit 111 is sent to a pure-color color-difference converting circuit 112 to be converted into a signal Y and color-difference signals R-Y and B-Y. These color-difference signals R-Y and B-Y are sent to a C-SUP circuit 113. At the C-SUP circuit 113, the color-difference signals R-Y and B-Y are subjected to a process of killing the color of their saturated areas. The output of the C-SUP circuit 113 is sent through a horizontal low-pass filter circuit 114 to a Y compensating circuit 120 and also to a color compensating circuit 115.

Meanwhile, at the luminance processing part, the output of the white balance circuit 106 is processed to correct a difference in luminance brought about by the color filters. This process is carried out through a vertical low-pass filter circuit 116 and a horizontal low-pass filter circuit 117. Then, an edge emphasizing process is performed by a luminance aperture correcting (APC) circuit 118. The output of the APC circuit 118 is sent to a gamma correcting circuit 119 to be subjected to a gamma correction process. After that, a luminance signal thus obtained is sent from the gamma correcting circuit 119 to the Y compensating circuit 120 to have its luminance finely adjusted by using the color-difference signal coming from the horizontal low-pass filter circuit 114.

The color-difference signals processed by the color processing part and the luminance signal processed by the luminance processing part are sent to a compressing circuit 121 to be compressed in accordance with the JPEG system or the like and, after that, are stored in a memory 122 such as a flash memory.

Next, the action of the white balance circuit 106, which presents a main feature of the first embodiment, is described as follows.

In a case where the complementary color filters of the image sensor 101 are arranged as shown in FIG. 2, for example, an array of eight pixels shown in FIG. 2 constitutes one unit block. The whole picture is composed of such unit blocks which are repeatedly arranged. The upper or lower four pixels Ma, G, Cy and Ye of each block of eight pixels are used as a white evaluating sample point. A color evaluation value is computed for each of the white evaluating sample points in a manner as expressed below:

$(Ma-G)/Y$, $(Ye-Cy)/Y$ (Y: a luminance signal)

Then, any point that is included within a white determining range set beforehand is determined to be white and is subjected to an integrating action.

The above-mentioned white determining range is set in the following manner. Shots of a white paper are taken at a plurality of color temperatures existing in the natural world. The color evaluation value is thus obtained at each color temperature. Then, the white determining range is set by plotting the color evaluation values on a graph with $(Ye-Cy)/Y$ taken on the X axis and $(Ma-G)/Y$ on the Y axis, as shown in FIG. 3.

A flow of processes to be executed at the white balance circuit 106 is next described as follows.

(1) The white determining range is corrected according to photo-taking conditions of an object and/or conditions of an object. This process prevents detection of such a signal that is included within the white determining range but has a color temperature which greatly differs from its actual color temperature, and also improves the white determining accuracy in a case where a flash device is used for shooting under a daylight condition.

The above-stated photo-taking conditions of an object and/or conditions of an object include an EV value indicative of brightness, a shutter speed value TV, an F-number which is an aperture value, a distance to the object of shooting, information on the on-state or off-state of a flash device, a degree of effect (influence) of external light and flash light on the object of shooting, etc.

When the flash light is off in shooting, if the EV value is larger than a certain value, the shooting operation is assumed to have been performed outdoors. Then, a limiter, which is a value on the X axis, i.e., in the direction of changes of color temperature, on the side of low color temperature in the white determining range is shifted toward the side of high color temperature, as shown on the right side part of FIG. 4(a). The outdoor light (normal light) is around 5000 K in most cases. According to experiences, in a case where the EV value is 10 or above, the probability of the outdoor shooting is great. On the basis of this probability, the limiter is shifted with the EV value used as an input, by a linear arithmetic operation as expressed by the following formula (1-1):

$$\text{limit Low Temp} = a1*EV + b1 \quad (1\text{-}1)$$

Further, in a case where the EV value is a relatively large value (about 13 or above), a limiter on the high color temperature side, as shown on the left side part of FIG. 4(a), is also shifted toward the low color temperature side (around 6000 K) by using a formula (1-2) shown below. This shift is made for the purpose of preventing a light blue color of the sky from being misjudged to be white. Further, since the color temperature of an object in the shade sometimes exceeds 6000 K, the limit is preferably set at about 7000 K.

$$\text{limit High Temp} = a2 * EV + b2 \quad (1\text{-}2)$$

In the case of shooting with flash light, the effect of external light increases accordingly as the degree of effect of the flash light on the object decreases. In this case, therefore, the area of the white determining range is broadened so as to enable the white determining range to follow external light. Hence, the degree of effect of the flash light on the object "effectFlash" is obtained from the distance to the object, the EV value, the amount of emission of the flash light, etc. Then, according to the degree of effect "effectFlash", the white determining range is changed by using the following formula (1-3), as shown in FIG. 4(b). Similar to the above-stated formulas (1-1) and (1-2), the formula (1-3) is a linear equation. In the formula (1-3), the degree of effect is used as an input and the limiter value as an output.

$$\text{limit Flash Temp} = a3 * \text{effectFlash} + b3 \quad (1\text{-}3)$$

Incidentally, the degree of effect of the flash light on the object is computed in a manner as disclosed, for example, in U.S. Pat. No. 5,568,187 (Okino), etc.

Further, in a case where the shutter speed value TV indicates a relatively long shutter time and the aperture F-number indicates a full aperture value, it can be judged that an indoor shooting is being performed. In that case, the limiter on the high color temperature side is shifted up to the color temperature of a fluorescent lamp light, as shown in FIG. 4(c). The limiter, in that case, is also set by carrying out a linear arithmetic operation according to the following formula with the TV value used as an input and the limiter value (the value on the X axis) as an output:

$$\text{limit TV Temp} = a4 * TV + b4 \quad (1\text{-}4)$$

Next, in order to control the gain of each color signal, a first gain control value and a second gain control value are computed.

The first gain control value is computed on the basis of the signal of such a sample point that is included within the white determining range determined by the process (1) described above. As mentioned above, the sample point is composed of four pixels Ma, G and Cy and Ye, which constitute one set, as shown in FIG. 12.

The second gain control value is computed on the basis of a signal obtained by averaging signals of such a small area (sample area) that is included within the white determining range determined by the process (1) described above. Herein, the small area means one area of m areas into which one picture is divided. The signal of the small area means a signal obtained by averaging each of the pixel signals Ma, G, Cy and Ye existing within the small area.

The method for computing and obtaining the first gain control value is described first as follows.

(2) A check is made to find if the sample point shown in FIG. 12 satisfies all of the following formulas:

$$\text{Dark Threshold} < (Ma+G+Cy+Ye)/4$$

Bright Threshold>Ma

Bright Threshold>G

Bright Threshold>Cy

Bright Threshold>Ye (3) At a sample point which satisfies all the formulas of the process (2), color evaluation values wX and wY are computed and obtained by the following formulas:

$$wX = (Ye - Cy)/Ylow \quad (I)$$

$$wY = (Ma - G)/Ylow \quad (II)$$

where Ylow=(Ma+G+Cy+Ye).

(4) A check is made to find if the color evaluation values obtained at each sample point by the above process (3) are included within the white determining range determined by the above process (1). If so, an output signal from each pixel of the sample point is added to a adding register for each color. This process is carried out for all sample points on the picture, in a manner as expressed below:

$$\text{reg1}Ma = \text{reg1}Ma + Ma$$

$$\text{reg1}G = \text{reg1}G + G$$

$$\text{reg1}Cy = \text{reg1}Cy + Cy$$

$$\text{reg1}Ye = \text{reg1}Ye + Ye$$

(5) Upon completion of the above process (4) for all the sample points, the total number of the sample points determined to be white by the process (4) is substituted for SN1 in formulas which will be described later herein, and the total number of the sample points determined to be not-white is substituted for SN2 in these formulas.

(6) The first gain control value is obtained from the adding registers of the process (4), as follows:

$$gmg1 = \text{aveReg1}/\text{reg1}Ma$$

$$gg1 = \text{aveReg1}/\text{reg1}G$$

$$gcy1 = \text{aveReg1}/\text{reg1}Cy$$

$$gye1 = \text{aveReg1}/\text{reg1}Ye$$

where aveReg1=(reg1Ma+reg1G+reg1Cy+reg1Ye)/4.

Next, a method for computing the second gain control value is described. The second gain control value is computed in parallel with the process of computing the first gain control value.

(7) While one picture is divided into m small areas as shown in FIG. 12, an adding register arranged to store the sum value of each of pixel signals Ma, G, Cy and Ye for each of divided small areas (sample areas) is first initialized, in a manner as expressed below:

reg2Ma[m]

reg2G[m]

reg2Cy[m]

reg2Ye[m]

(8) A check is made to find if the value of level of an output signal from each pixel of the sample point, within each divided small area (sample area), satisfies all of the following formulas. In other words, the sample point is examined to find if it is within a brightness range in which white balance data can be adequately computed.

$$\text{Dark Threshold} < (Ma+G+Cy+Ye)/4$$

Bright Threshold>Ma

Bright Threshold>G

Bright Threshold>Cy

Bright Threshold>Ye

In these areas, the value of level of an output signal from each pixel of such sample points that satisfy these formulas is added to the adding register for each color, in a manner as expressed below:

$reg2Ma[m]=reg2Ma[m]+Ma$ $reg2G[m]=reg2G[m]+G$ $reg2Cy[m]=reg2Cy[m]+Cy$ $reg2Ye[m]=reg2Ye[m]+Ye$ (9) In each of the divided small areas, the values of the adding register for each color obtained by the process (8) are averaged. The values thus obtained by averaging are substituted into the above-stated formulas (I) and (II) to obtain the color evaluation values of the applicable small area (sample area). Then, the color evaluation values of each of the small areas are checked to find if they are included within the white determining range determined by the above process (1). Then, the value of the adding register of only the small area that is determined to be included within the white determining range is added to an area averaging register for each color, in a manner as expressed below:

$reg2Ma=reg2Ma+reg2Ma[m]$ $reg2G=reg2G+reg2G[m]$ $reg2Cy=reg2Cy+reg2Cy[m]$ $reg2Ye=reg2Ye+reg2Ye[m]$

(10) The second gain control value is obtained by the following formulas on the basis of the values of the area averaging registers obtained by the above process (9):

$gmg2=aveReg2/reg2Ma$ $gg2=aveReg2/reg2G$ $gcy2=aveReg2/reg2Cy$ $gye2=aveReg2/reg2Ye$ where $aveReg2=(reg2Ma+reg2G+reg2Cy+reg2Ye)/4$.

Incidentally, in a case where none of the color evaluation values of each small area obtained by the process (9) are determined to be included within the white determining range determined by the process (1), the area of each divided small area (sample area) of the picture is stepwise expanded until any one of the color evaluation values of the expanded area comes to be included within the white determining range determined by the process (1).

(11) White balance adjusting data (wmg1, wg1, wcy1 and wye1) are formed according to the ratio between the values SN1 and GN2 obtained by the process (5), the first gain control value obtained by the process (6) and the second gain control value obtained by the process (10), for example, as follows.

In the case of "$(SN1/(SN1+SN2))>\alpha$", the first gain control value is employed as white balance adjusting data as it is.

$wmg1=gmg1$ $wg1=gg1$ $wcy1=gcy1$ $wge1=gye1$

In the case of "$\beta<(SN1/(SN1+SN2))<\alpha$", a linear function of an output p defined by the input SN1 is prepared based on the following condition:

(Condition)

If $SN1=\alpha$, then $p=1$.

If $SN1=\beta$, then $p=0$.

(Linear function)

$p=a\times SN1+b$ where $a=1/(\alpha-\beta)$ and $b=-\beta/(\alpha-\beta)$, which are calcualted from the condition. By using the value p obtained in the above equation, the white balance adjusting data (wmg1, wg1, wcy1 and wye1) are calculated as follows:

$wmg1=p*gmg1+(1-p)*gmg2$ $wg1=p*gg1+(1-p)*gg2$ $wcy1=p*gcy1+(1-p)*gcy2$ $wye1=p*gye1+(1-p)*gye2$ In the case of "$(SN1/(SN1+SN2))\leq\beta$", $wmg1=gmg2$ $wg1=gg2$ $wcy1=gcy2$ $wye1=gye2$ (on condition that $0\leq\beta<\alpha\leq 1$)

Then, these values are stored as white balance adjusting data.

As described above, the first embodiment is arranged to vary the white determining range according to the shooting condition and/or the object condition. By virtue of this arrangement, a white balance signal can be accurately obtained without the fear of detecting from within the white determining range any signal that shows a color temperature which greatly differs from its actual color temperature.

In the first embodiment described above, the image sensor is provided with complementary color filters arranged as shown in FIG. 2. However, the image sensor may be arranged to have pure color filters, instead of the complementary color filters. In that case, the color evaluation values can be set by using the color-difference signals R-Y and B-Y.

Figure 9A:
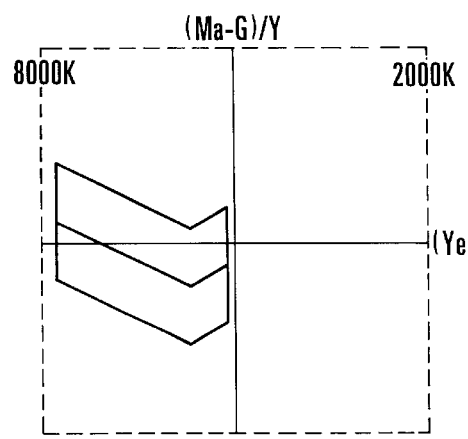
FIGS. 9(a), 9(b), 9(c) and 9(d) are diagrams for respectively explaining the white determining ranges.
Figure 9B:
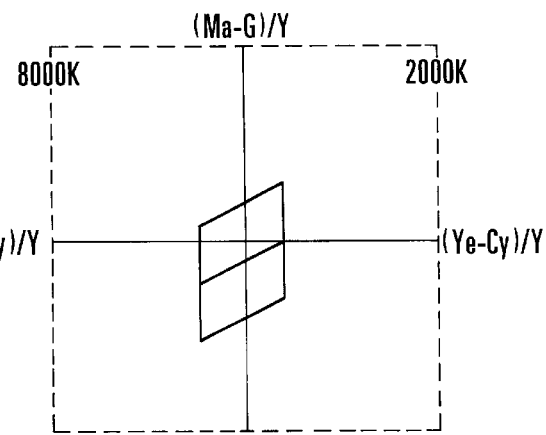
Figure 9C:
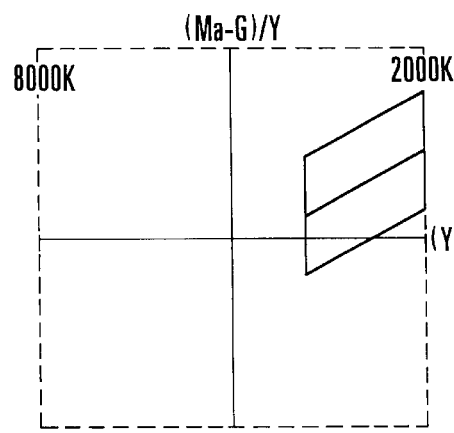
Figure 9D:
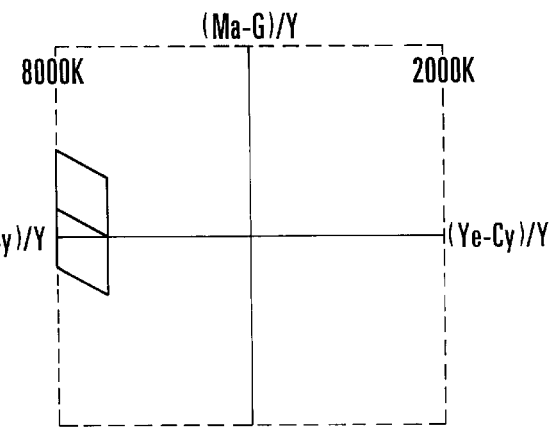
Figure 10:
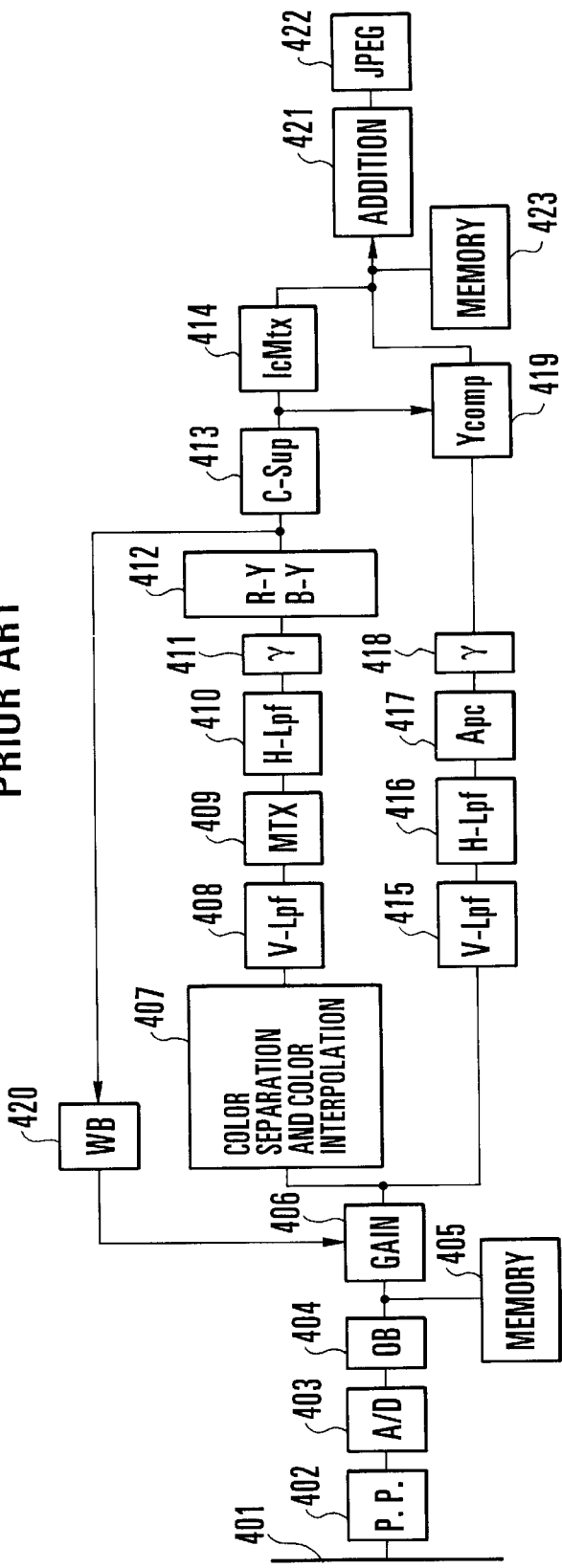
FIG. 10 is a block diagram showing the structure of the signal processing system of a conventional image pickup apparatus.
Figure 11:
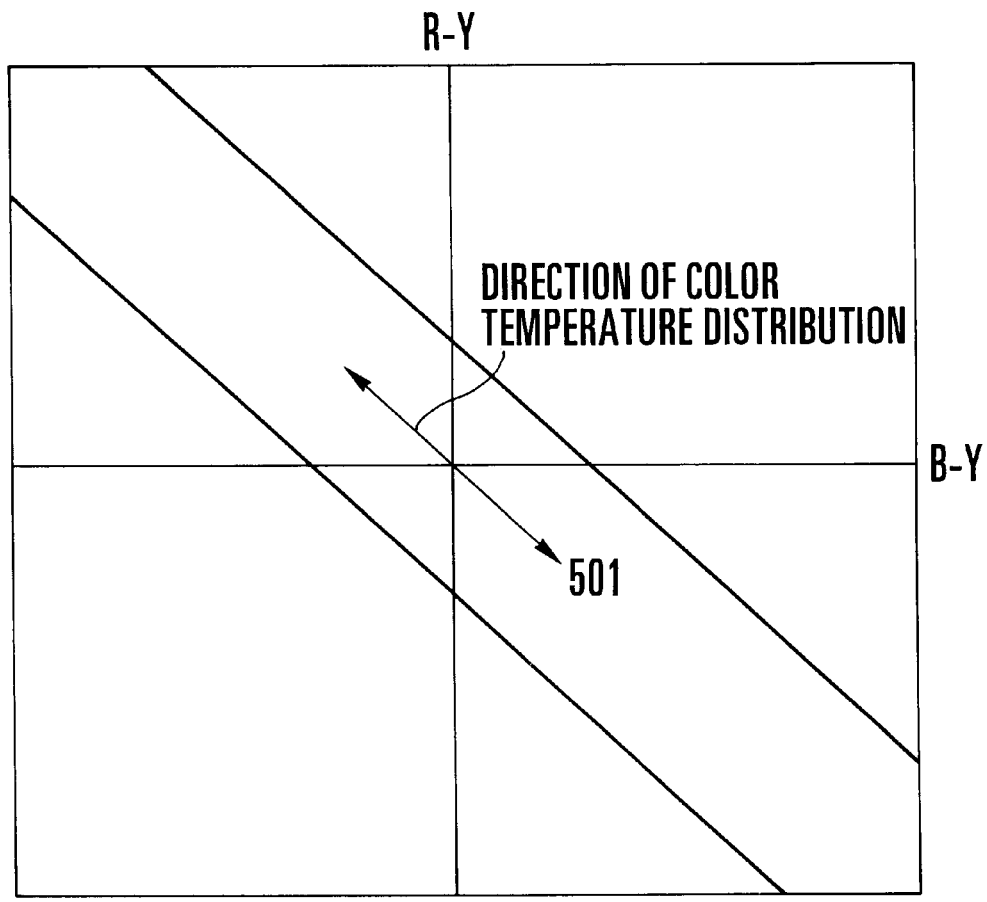
FIG. 11 is a diagram for explaining a white determining range of the conventional image pickup apparatus.

Further, while the first embodiment is arranged to automatically decide the width of area of the white determining range, the arrangement may be changed to manually set the width as shown in FIGS. 9(a) to 9(d). For example, in that case, the white determining range is limited as shown in FIG. 9(a) in the case of sunlight, as shown in FIG. 9(b) in the case of fluorescent light, as shown in FIG. 9(c) in the case of tungsten light, and as shown in FIG. 9(d) in the case of flash light.

Second Embodiment

A second embodiment of the invention is arranged to perform the white balance adjusting process in the following manner. In the case of the second embodiment, the white determining range as set in the first embodiment is divided by color temperature into a plurality of white determining areas. Then, from among the plurality of white determining ranges, an apposite white determining area is selected according to the shooting condition and/or the object condition. The white balance is controlled on the basis of sample points having color evaluation values included within the selected white determining area and also on the basis of areas obtained by dividing one picture into m areas. Further, the second embodiment is provided with complementary-color-to-pure-color converting matrixes for different values of color temperature. The color temperature is computed by averaging the color evaluation values included within the selected white determining area. Then, a matrix corresponding to the computed color temperature is selected from among the plurality of matrixes.

The flow of white balance adjusting processes of the second embodiment is described below. In the flow of processes, the method for obtaining the second gain control value is the same as in the first embodiment, and is, therefore, omitted from the following description.

(1) The white determining range is divided beforehand into a total of six white determining areas by color temperature within a range approximately from 8000 K to 2000 K at intervals of 1000 K.

In order to obtain images with an optimum color reproducibility, the matrixes used for conversion from complementary colors to pure colors must be changed according to the color temperature of the object. To attain the optimum color reproducibility, therefore, the number of the color conversion matrixes necessary within the color temperature range of an applicable illumination light is decided beforehand. The white determining range is then divided into k white determining areas in correspondence to the ranges of color temperature to be reproduced with the respective matrixes.

(2) To obtain the first gain control value, the sample point as shown in FIG. 12 is checked to find if its brightness is sufficient for computing white balance data, in the same manner as in the case of the first embodiment.

(3) Color evaluation values wX and wY are obtained at the sample point, as expressed below:

$wX=(Ye-Cy)/Y$low $wY=(Ma-G)/Y$low where Ylow=(ma+G+Cy+Ye)/4.

(4) The color evaluation values obtained by the process (3) are added to the values of the adding registers arranged for an applicable white determining area among the preset white determining areas, as expressed below:

$reg1Ma[k]=reg1Ma+Ma$ $reg1G[k]=reg1G+G$ $reg1Cy[k]=reg1Cy+Cy$ $reg1Ye[k]=reg1Ye+Ye$ ($0 \leq k \leq 5$)

(5) Upon completion of the process (4) for all sample points, the total number of samples determined to be white by the process (4) is substituted for the value SN1 and the total number of samples determined to be not white is substituted for the value SN2.

Figure 5:
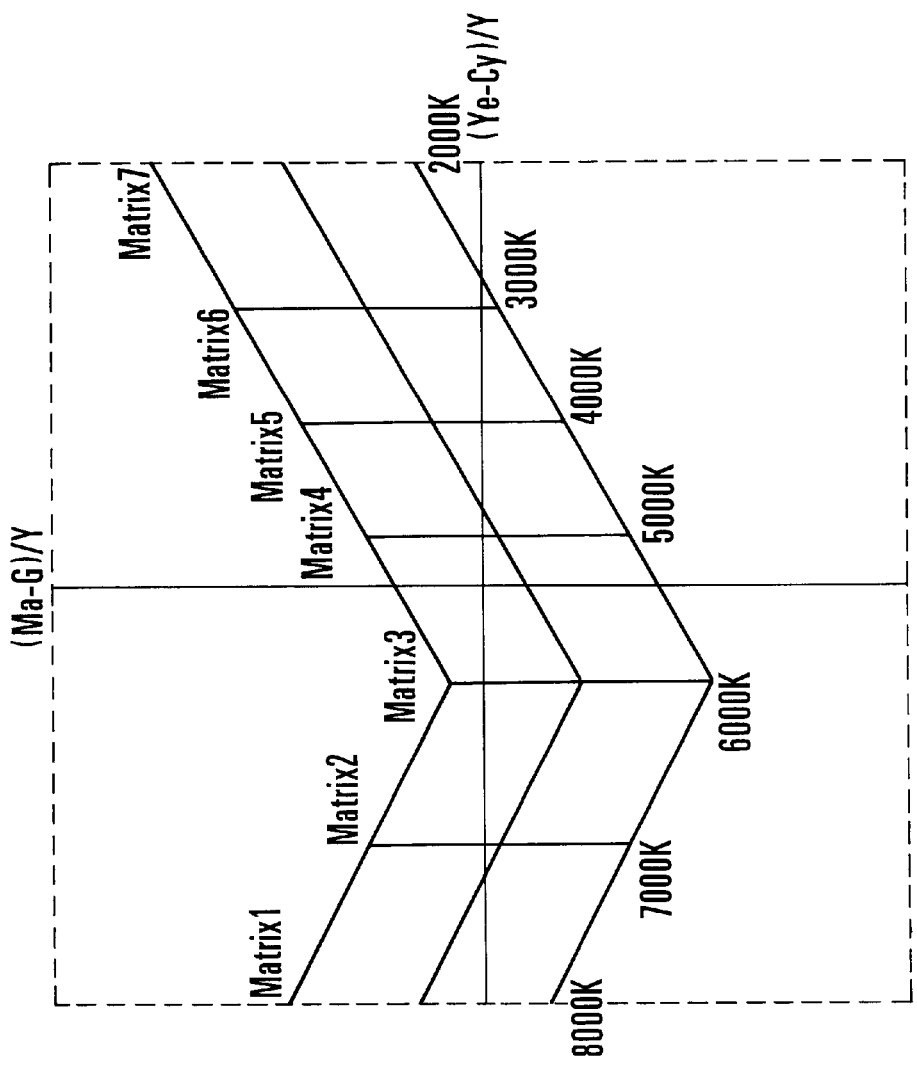
FIG. 5 is a diagram for explaining the division of a white determining range by color temperature in a second or third embodiment of the invention.

(6) An apposite white determining area is selected from among the six white determining areas shown in FIG. 5 according to the shooting condition and/or the object condition. The first gain control value is obtained from the adding registers of the white determining area selected. Then, in the same manner as in the first embodiment, the white balance adjusting data is prepared on the basis of the first and second gain control values. The white balance is corrected according to the white balance adjusting data.

As in the case of the first embodiment, the shooting condition and/or the object condition in the second embodiment includes an EV value indicative of brightness, a TV value indicative of a shutter speed, an F-number indicative of an aperture value, a distance to the object, information on the on-state or off-state of a flash device, the degree of effect (influence) on the shooting object of external light or flash light, etc.

When the flash light is off in shooting, if the EV value is larger than a certain value, the shooting operation is assumed to have been performed outdoors. Then, a white determining area corresponding to the white determining range which is similar to that of the first embodiment is defined and restricted. If the number of points having color evaluation values included within the white determining area becomes zero as a result of the restriction, the number of white determining areas is increased by one.

If the EV value is a relatively large value (about 13 or above), use of any white determining area on the high color temperature side (around 6000 K) is inhibited to prevent the light blue color of the sky from being misjudged to be white.

When the light of a flash device is used, the degree of effect of the flash light on the object of shooting is obtained from a distance to the main object, the EV value, the amount of flash light emission, etc. One of the white determining areas is selected according to the degree of effect thus obtained. As in the first embodiment, in a case where the flash light has a high degree of effect on the object, the second embodiment uses only a white determining area which corresponds to the color temperature of the flash light. The selecting range for the white determining area is broadened up to the area of external light accordingly as the degree of effect of the flash light decreases.

In a case where the shutter speed value TV is set to a relatively long shutter time with the F-number (value) indicative of a maximum (full-open) aperture position, the shooting operation is considered to be the indoor shooting. In that case, the white determining area on the high color temperature side is gradually excluded from use, as in the case of the first embodiment.

(7) The color temperature of an applicable light source is computed and obtained from the average value of color evaluation values included within the white determining area selected by the process (6). A color conversion matrix corresponding to the color temperature as obtained is selected from among others. For example, referring to FIG. 5, if the color temperature of the light source is computed as 5100 K, a matrix 4 which corresponds to the color temperature of 5000 K, which is closest to the color temperature of 5100 K, is selected.

In the second embodiment, a white determining range is divided into a plurality of white determining areas by color temperature and an apposite white determining area is chosen from among these white determining areas according to the shooting condition and/or the object condition as described above. The arrangement effectively eliminates the possibility of detecting any sample point showing a color temperature which greatly differs from its actual color temperature, so that an accurate white balance signal can be obtained. Further, the second embodiment is arranged to select a color conversion matrix on the basis of a computed color temperature of the light source. For example, a matrix which emphasizes a red color is selected, if the color temperature of the light source is high, or a matrix which emphasizes a blue color is selected if the light source has a low color temperature, so that the color can be reproduced in an optimum manner at the color temperature.

In the second embodiment described above, the image sensor is provided with complementary color filters arranged as shown in FIG. 2. However, the image sensor may be arranged to be provided with pure color filters, instead of the complementary color filters. In that case, the color evaluation values can be set by using the color-difference signals R-Y and B-Y.

Further, while the second embodiment is arranged to automatically select the white determining area from among a plurality of areas shown in FIG. 5. However, as in the case of the first embodiment, this arrangement may be changed to manually select the white determining area from among the plurality of areas.

Third Embodiment

A third embodiment of the invention is arranged to perform the white balance adjusting process in the following manner. In this case, the white determining range in the first embodiment is divided by predetermined color temperatures into a plurality of white determining areas. The values of adding registers for applicable white determining areas are respectively corrected to attach weight to them according to the shooting condition and/or the object condition. Further, the third embodiment is provided with complementary-color-to-pure-color converting matrixes for the respective color temperatures in the same manner as in the case of the second embodiment. Color temperature is extracted from the computed white balance coefficients. Then, a matrix which corresponds to the extracted color temperature is selected from among the plurality of matrixes.

The flow of white balance adjusting processes of the third embodiment is described below. In the flow of processes, the method for obtaining the second gain control value is the same as in the first embodiment and is, therefore, omitted from the following description.

(1) The white determining range is divided beforehand into a total of six white determining areas by color temperature within a range approximately from 8000 K to 2000 K at intervals of 1000 K, as shown in FIG. 5.

(2) To obtain the first gain control value, the sample point is checked to find if its brightness is sufficient for computing white balance data, in the same manner as in the case of the first embodiment.

(3) Color evaluation values wX and wY are obtained at the sample point. The color evaluation values thus obtained are checked to find to which of the six white determining areas they apply.

$$wX = (Ye - Cy)/Ylow$$

$$wY = (Ma - G)/Ylow$$

where $Ylow = (ma + G + Cy + Ye)/4$.

(4) The color evaluation values obtained by the process (3) are added to the values of the adding registers of an applicable white determining area among the preset white determining areas, as expressed below:

$$reg1Ma[k] = reg1Ma + Ma$$

$$reg1G[k] = reg1G + G$$

$$reg1Cy[k] = reg1Cy + Cy$$

$$reg1Ye[k] = reg1Ye + Ye \quad (0 \leq k \leq 5)$$

(5) Upon completion of the process (4) for all sample points, the total number of sample points determined to have color evaluation values included within the white determining area by the process (4) is substituted for the value SN1 and the total number of sample points determined to have no color evaluation values included within the white determining area is substituted for the value SN2.

(6) For the six white determining areas, correction gains applicable to the adding registers of the white determining areas are obtained, according to the shooting condition and/or the object condition, from a graph of FIG. 6(a) which shows the relation of correction gains to color temperatures. After that, the first gain control value is obtained from the averaged values of the adding registers of the white determining area obtained after gain correction. Then, in the same manner as in the first embodiment, white balance adjusting data is prepared on the basis of the first and second gain control values. The white balance is adjusted according to the white balance adjusting data.

In shooting without using any flash light, if the EV value is 13, for example, the shooting operation is assumed to be the outdoor shooting. In this case, the gain of the values of the adding registers of the white determining areas on the low color temperature side is lowered as shown in a color-temperature/correction-gain graph on the right side of FIG. 6(a). When the EV value is 13, for example, the gains of the white determining areas of color temperature ranges from 2000 K to 400 K and from 7000 K to 8000 K are "0", so that the values of the applicable adding registers become "0". Since the correction gain of the white determining area of a color temperature range from 4000 K to 5000 K is 0.25, in this instance, the values of the adding registers for this area are multiplied by 0.25. Further, since the correction gain of the white determining area of a color temperature range from 5000 K to 7000 K is 1.0, the values of the adding registers for this area are multiplied by 1.0. Then, the first gain control value is obtained from the averaged value of the values of the adding registers which have been gain-corrected in the above manner. Graphs showing such correction gains in relation to color temperature are prepared to cover an adequate number of EV values, using the color temperature as inputs and the correction gain as outputs. In the case of the third embodiment, four graphs of this kind are prepared for EV values from EV13 to EV10.

Meanwhile, as shown on the left side part of FIG. 6(a), the values of the adding registers of the white determining areas on the high color temperature side are also corrected. This correction is made for the purpose of preventing a light blue color of the sky from being misjudged to be white.

In the case of shooting with a flash light, the degree of effect of the flash light on the shooting object is obtained from a distance to the main object, an EV value, an amount of light emission from the flash device, etc. The gain of the white determining area is varied according to the degree of effect of the flash light thus obtained. As shown in FIG. 6(b), in a case where the flash light has a high degree of effect on the object, the weight to be attached to the white determining areas are restricted to the peripheral part of the color temperature of the flash light. The range of the attaching weight to the white determining areas is gradually broadened accordingly as the degree of effect of the flash light decreases, so as to enable the white determining areas to follow external light.

The process of attaching weight according to shutter speeds is also carried out in the same manner as in the case of the first embodiment. The amount of weight on the white determining areas on the high color temperature side is decreased in the event of a low shutter speed.

(7) The values of the adding registers of the white determining areas are corrected by the process (6). The color evaluation values are computed according to the formulas of the process (3) and obtained from the averaged value of each adding register obtained after the gain correction. The color temperature of the light source corresponding to the computed color evaluation values is obtained from the graph of FIG. 5. After that, a color converting matrix which corresponds to the color temperature of the light source is selected.

As described above, the white determining range is divided by color temperature into a plurality of white determining areas, and the values of the adding registers provided for these white determining areas are weighted according to the shooting condition and/or the object condition. A white balance signal can be accurately obtained by these processes. Further, since an apposite matrix is selected on the basis of the color temperature of the light source computed as described above, colors can be reproduced in an optimum manner at the color temperature.

In the third embodiment described above, the image sensor is provided with complementary color filters arranged as shown in FIG. 2. However, the image sensor may be arranged to be provided with pure color filters, instead of the complementary color filters. In that case, the color evaluation values can be set by using the color-difference signals R-Y and B-Y.

Further, the third embodiment may be arranged, as in the first embodiment, to manually set a condition of illumination for shooting and to set weight according to the illumination condition. White balance then can be adjusted more effectively by that arrangement.

Fourth Embodiment

Figure 7:
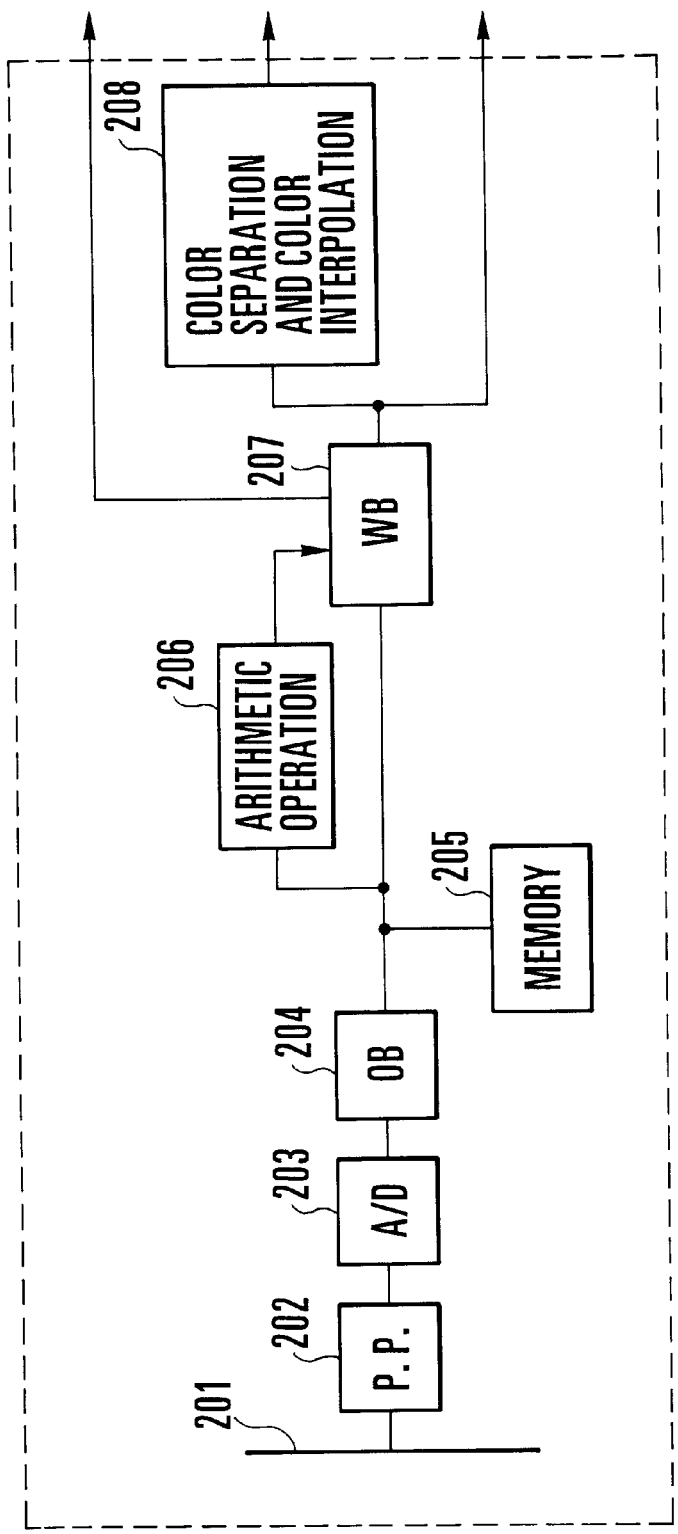
FIG. 7 is a block diagram showing the structure of the signal processing system of an image pickup apparatus according to a fourth embodiment of the invention.

FIG. 7 is a block diagram showing the structure of the signal processing system of an image pickup apparatus according to a fourth embodiment the invention. In this case, processes to be performed after adjustment of white balance are the same as those of the first embodiment and are, therefore, details of these processes are omitted from the following description. In the fourth embodiment, a white balance adjusting block arranged to be used with a non-addition read-out from an image sensor is arranged to be usable also with an addition read-out from the image sensor.

An output signal from the image sensor 201 is sent through a preprocessing circuit 202 to an A/D converting circuit 203 to be converted into a digital signal. The black level of the digital signal is uniformalized by an OB circuit 204. The output of the OB circuit 204 is temporarily stored in a memory 205. An image signal read out from the memory 205 is sent to an arithmetic operation part 206 to be restored into complementary color signals, which are sent to a white balance circuit 207 to have gain control values computed there. Then, the image signal is sent out in a state of having its white balance adjusted by the gain control values obtained by the white balance circuit 207.

The details of processes to be performed by the arithmetic operation part 206 are as described below. Signals Wr, Wb, Gr and Gb which are obtained by the addition read-out from the image sensor 201 are expressed as follows:

$$Wr=Ma+G \quad (4\text{-}1)$$

$$Wb=Ma+Cy \quad (4\text{-}2)$$

$$Gb=G+Cy \quad (4\text{-}3)$$

$$Gr=G+Ye \quad (4\text{-}4)$$

It is apparent that signal G-Cy is obtained from the formulas (4-1) and (4-2) and a signal G is obtained from the formula (4-3). Signals Ma, G, Cy and Ye are thus restored and are sent to the white balance circuit 207. The output of the white balance circuit 207 is sent to a color-separation and color-interpolation circuit 208.

As described above, in a case where a non-addition read-out is performed from the image sensor 201 having complementary color filters and the white determining range for the white balance circuit 2078 is set, for example, with gain control values "(Ma−G)/Y" and "(Ye−Cy)/Y", output values (Wr, Wb, Gr and Gb) obtained by the addition read-out from the image sensor 201 are subjected to arithmetic operations to be restored into signals Ma, G, Cy and Ye, and the restored signals Ma, G, Cy and Ye are inputted to the white balance circuit 207. This arrangement enables the circuits in the white balance block to be usable both in the case of the addition read-out and the non-addition read-out. Besides, only one set value is sufficient for the white determining range.

Fifth Embodiment

An image pickup apparatus according to a fifth embodiment of the invention includes any of the white balance circuits in the first, second and third embodiments described in the foregoing. The fifth embodiment, however, differs from the other embodiments in that the image signal from the image sensor is subjected to color-separating and band-limiting processes before it is supplied to the white balance circuit.

In a case where an image picked up has many edges, problems arise in that (i) the number of samples to be used for white balance adjustment decreases as the color evaluation values of sample points in the edge parts are excluded from the white determining range and (ii) some of edge parts might be misjudged to be white of a different color temperature. To solve these problems, a low-pass filter is applied to the image signal to limit its frequency band in such a way as to eliminate edges before the signal is supplied to the white balance circuit.

Figure 8:
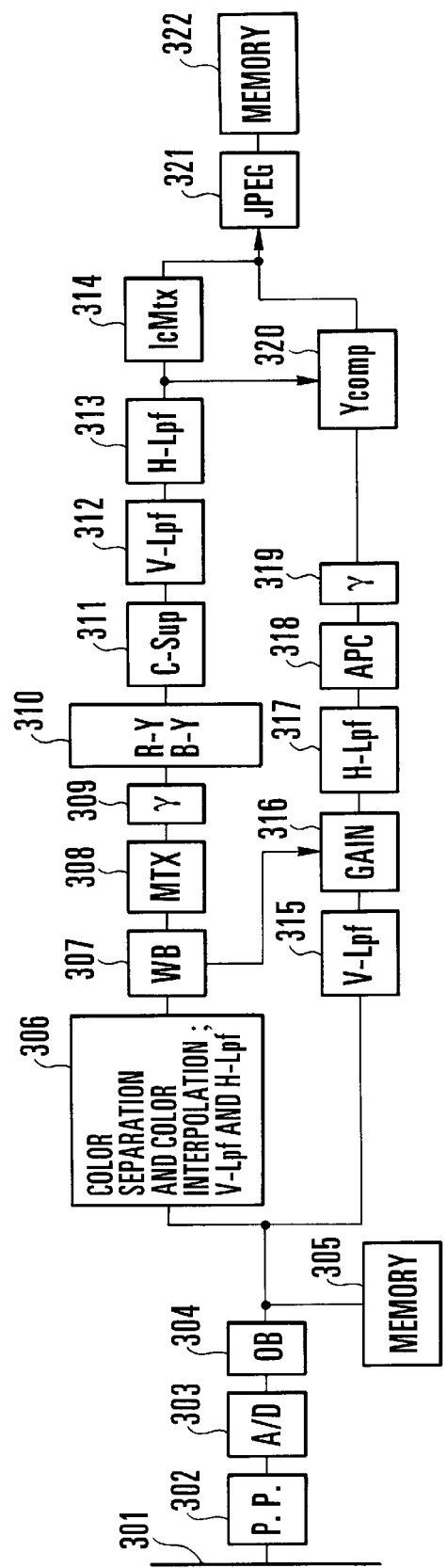
FIG. 8 is a block diagram showing the structure of the signal processing system of an image pickup apparatus according to a fifth embodiment of the invention.

FIG. 8 is a block diagram showing the structure of a signal processing system of the image pickup apparatus according to the fifth embodiment. Referring to FIG. 8, the output signal of an image sensor 301 is supplied through a preprocessing circuit 302 to an A/D converting circuit 303 to be converted into a digital signal. The black level of the digital signal is uniformalized by an OB circuit 304 and is then temporarily stored in a memory 305. The digital signal read out from the memory 305 is sent to a color-separation and color-interpolation circuit 306 to be processed by a light low-pass filter in the horizontal and vertical directions concurrently with a color-separation process. The output of the color-separation and color-interpolation circuit 306 is sent to a white balance circuit 307 to have signal gains corrected to adjust the white level of each color. Meanwhile, the signal from the memory 305 is sent also to a luminance processing part. In the luminance processing part, the image signal, after passing through a vertical low-pass filter circuit 315, has its white level corrected by a gain correcting circuit 316.

In the color processing part, the output of the white balance circuit 307 is sent to a matrix circuit 308 to be converted into signals R, G and B. The signals R, G and B are sent to a gamma correcting circuit 309 to be subjected to a gamma correcting process. The output of the gamma correcting circuit 309 is sent to a pure-color color-difference converting circuit 310 to be converted into a signal Y and color-difference signals R-Y and B-Y. These color-difference signals R-Y and B-Y are sent to a C-SUP circuit 311. At the C-SUP circuit 311, the color-difference signals R-Y and B-Y are subjected to a process of killing colors of saturated areas. The output of the C-SUP circuit 311 is sent through a vertical low-pass filter circuit 312 and a horizontal low-pass filter circuit 313 to a Y compensating circuit 320 and also to a color compensating circuit 314.

Meanwhile, at the luminance processing part, the image signal from which a stepped difference in luminance is removed by the horizontal low-pass filter circuit 317 is supplied to an APC circuit 318 to be subjected to an edge emphasizing process. The output of the APC circuit 318 is sent to a gamma correcting circuit 319 to be subjected to a gamma correction process. After that, a luminance signal thus obtained is sent from the gamma correcting circuit 319 to the Y compensating circuit 320 to have its luminance finely adjusted by using the color-difference signals supplied from the horizontal low-pass filter circuit 313.

The color-difference signals from the color processing part and the luminance signal from the luminance processing part are sent to a compressing circuit 321 to be compressed in accordance with the JPEG system or the like and, after that, are stored in a memory 322 such as a flash memory.

The arrangement described above enables the fifth embodiment to effectively prevent the decrease of samples and the color misjudgment due to many edge parts included in an image.

Sixth Embodiment

A white balance circuit employed in the signal processing system of an image pickup apparatus according to a sixth embodiment of the invention is the same as the white balance circuit of any of the first to fifth embodiments. However, the sixth embodiment differs from the other embodiments in the manner in which the matrix to be used for color conversion is obtained. In the case of the sixth embodiment, several matrixes are arranged beforehand for variations in color temperature as shown in FIG. 5. In the case of FIG. 5, seven matrixes are arranged for a color temperature range from 8000 K to 2000 K, which are divided at intervals of 1000 K.

When the non-addition read-out is performed on an image sensor having complementary color filters, gain control values wbMa, wbG, wbCy and wbYe are outputted from the white balance circuit. From these values, an X-axis value wX of color evaluation values, as shown in FIG. 5, is obtained as expressed below $$wX = (1/wbYe - 1/wbCy) \quad (6\text{-}1)$$

Next, a white determining area corresponding to this value wX is obtained. Then, a new matrix newMAT is prepared by the following linear arithmetic operation, using two matrixes matA and matB of color temperature limiters limA and limB of the obtained white determining area, the value wX and a distance between the limiters limA and limB:

$$dis = limB - limA$$

$$newMat = ((dis(wX - limA))*matA + (dis(limB - wX))*matB)/dis \quad (6\text{-}2)$$

According to the arrangement of the sixth embodiment, a color evaluation value which indicates a color temperature is obtained by using a gain control value obtained from the white balance circuit. Then, a color conversion matrix can be obtained from this value by a linear arithmetic operation. By this arrangement, variations in color reproducibility due to change-over from one matrix to another can be smoothed.

As described above in the foregoing, according to one of the embodiments, in detecting the color temperature, a white determining range is varied according to the shooting condition and/or the object condition, so that the color temperature can be accurately detected without depending on the level of the luminance signal. This arrangement enables an accurate white balance signal to be obtained while effectively eliminating the possibility of detecting any signal existing within the white determining range in a state of greatly differing from its actual color temperature.

Further, according to one of the embodiments, a white determining range is divided beforehand into a plurality of white determining areas by color temperature. Electric charge accumulated at each sample point having color evaluation values included within each of the plurality of white determining areas is integrated for each color. From among the plurality of white determining areas, an apposite white determining area is selected according to the shooting condition and/or the object condition. A gain control value and color temperature are obtained by using the integrated value. Further, a plurality of matrixes for converting complementary colors into pure colors are prepared. The color temperature is obtained from the gain control value and the white determining area. One of the matrixes corresponding to the color temperature is selected. Accordingly, white balance can be appositely corrected. Further, since the matrix is selected on the basis of computed color temperature, colors can be reproduced most appositely to the color temperature.

Further, according to one of the embodiments, a white determining range is divided beforehand into a plurality of white determining areas by color temperature. Electric charge accumulated at each sample point having color evaluation values included within each of the plurality of white determining areas is integrated for each color. The gain of the integrated value of the white determining area is corrected according to the shooting condition and/or the object condition. A gain control value and color temperature are obtained by using the gain-corrected integrated value. A plurality of complementary-color/pure-color converting matrixes are prepared, and one of the matrixes corresponding to the computed color temperature is selected. Thus, the gain of any signal (integrated value) that is within the white determining area but greatly differs from its actual color is controlled in such a way as to lessen its influence, so that a more accurate white balance signal can be obtained. Further, since a matrix corresponding to the color temperature computed on the basis of the corrected integrated value, colors can be reproduced most appositely to the color temperature.

Further, according to one of the embodiments, a white determining area is set beforehand according to the shooting condition and/or the object condition. Electric charge accumulated at each sample point having color evaluation values included within the preset white determining area is integrated for each color to obtain a first gain control value. At the same time, while a picture is divided into a number of areas, an averaged color evaluation value is obtained for every one of the divided areas. A second gain control value is obtained on the basis of an integrated value corresponding to the color evaluation value included within the white determining area. Further, the number of pixels included within the white determining area and the number of pixels not included within the white determining area are detected. A mixing ratio between the detected numbers of pixels is computed. The first gain control value and the second gain control value are mixed according to the computed mixed ratio to obtain a gain control value for the output of the image sensor. Therefore, even if the first gain control value can not be accurately obtained due to a less number of or the absence of points included within the white determining area, the white balance can be saved from degrading too much, because the second gain control value is obtained on the basis of the integrated value corresponding to the color evaluation values included within the white determining area.

Further, according to one of the embodiments, even in a case where the non-addition read-out is performed on an image sensor having complementary color filters, the output values of the image sensor for the addition read-out are restored through an arithmetic operation to obtain a signal to be inputted to the white balance circuit. This arrangement permits use of one and the same circuit both for the addition read-out and the non-addition read-out.

Further, according to one of the embodiments, the signal outputted from the image sensor is divided by colors. Each of the divided signals is processed through a low-pass filter before it is inputted to the white balance circuit. This arrangement effectively prevents the decrease in number of samples and the misjudgment of colors due to edge parts existing in an image.

Further, according to one of the embodiments, the color evaluation value which indicates color temperature is obtained by using a gain control value obtained from the white balance circuit. Then, a color conversion matrix is obtained from this evaluation value by a linear arithmetic operation. That arrangement can effectively smooth variations of color reproduction caused by change-over from one matrix over to another.

The functions of each of the embodiments disclosed can be carried out by recording software program codes for the functions on a storage medium, by supplying the storage medium to a system or an apparatus, and by causing a computer (CPU or MPU) of the system or the apparatus to read the program codes from the storage medium and carry out the program codes stored there.

In this case, the functions of each of the embodiments are carried out by the program codes read out from the storage medium and the storage medium which stores the program codes represents each embodiment.

The storage medium to be used for supplying the program codes may be, for example, a floppy disk, a hard disk, an optical disk, a magneto-optical disk, a CD-ROM, a DC-R, a magnetic tape, a nonvolatile memory card, a ROM, etc.

While the functions of each of the embodiments can be accomplished by carrying out the program codes read by a computer as mentioned above, it is also possible to have the actual processes of the functions carried out either in part or in their entirety by an OS (operating system) which operates on the computer according to instructions given by the program codes.

Further, the functions of each of the embodiments can be also accomplished by reading the program codes from the storage medium, by writing the program codes into a memory provided on a function-expanding board inserted into the computer or a function-expanding unit connected to the computer, and, after that, by having the actual processes of the functions carried out either in part or in their entirety by a CPU or the like provided on the function-expanding board or the function-expanding unit in accordance with instructions given by the program codes.

In a case where the arrangement of each of the embodiments disclosed is to be applied to a storage medium in the manners mentioned above, the program codes which correspond to the flow of operation described in the foregoing are stored in the storage medium. In short, in such a case, a module indispensable to the image pickup apparatus according to each of the embodiments disclosed is stored in the storage medium.

What is claimed is:

1. An image pickup apparatus comprising:

an image sensor; and a white balance adjusting device adapted to evaluate a color signal outputted from said image sensor in a value, determine whether or not the value of the evaluated color signal is included within a white determining range to regard the color signal corresponding to the included value as white, and adjust white balance on the basis of control signal obtained from the color signal corresponding to the value determined to be included in the changed white determining range, wherein said white balance adjusting device changes an area of the white determining range smaller as the brightness of a field increases.

2. An image pickup apparatus according to claim 1, further comprising:

a matrix converting device adapted to perform color conversion of the color signal which said white balance adjusting device adjusts by using a matrix, wherein said matrix converting device has a plurality of different matrixes, and selects one of the plurality of matrixes to perform color conversion by using the selected matrix, according to color temperature of light source.

3. An image pickup apparatus according to claim 2, wherein said matrix converting device performs the color conversion of Ma, G, Cy and Ye signals into R, G and B signals.

4. An image pickup apparatus according to claim 1, further comprising:

a restoring device adapted to restore the color signal obtained by addition read-out from said image sensor into a color signal in non-addition read-out in case the color signal is read out from said image sensor with addition read-out, wherein the color signal restored by said restoring device is inputted to said white balance adjusting device.

5. An image pickup apparatus according to claim 1, further comprising:

a low-pass filter set in pre-process of said white balance adjusting device and arranged to restrict a frequency band of the color signal outputted from said image sensor.

6. An image pickup apparatus according to claim 1, further comprising:

a matrix converting device adapted to perform color conversion of the color signal adjusted by said white balance adjusting device by using a matrix, wherein said white balance adjusting device determines a color temperature of a light source on the basis of the color signal determined to be included within the white determining range, and generates the matrix of said matrix converting device on the basis of the determined color temperature.

7. An image pickup apparatus comprising:

an image sensor; and a white balance adjusting device adapted to perform a first evaluation of a color signal outputted from said image sensor, to perform a first determination of whether or not each value of a first color signal evaluated by the first evaluation is included within a white determining range, and to perform a second determination to determine whether or not each value of averaged color signals, respectively, obtained by averaging color signals in a divided area of one picture and evaluated by a second evaluation is included within the white determining range, wherein said white balance adjusting device obtains a first control signal on the basis of the values determined to be included within the white determining range by the first determination, obtains a second control signal on the basis of the values determined to be included within the white determining range by the second determination, obtains a third control signal from the first and second control signals according to a ratio of the number of sample points of the first color signal determined to be included within the white determining range, and the number of sample points of the first color signal not included within the white determining range by the first determination, and adjusts the white balance on the basis of the third control signal.

8. An image pickup apparatus according to claim 7, wherein said white balance adjusting device evaluates, in the second evaluation, the color signal obtained from the greater number of pixels than the number of the first evaluation.

9. An image pickup apparatus according to claim 7, wherein said white balance adjusting device expands the area to be divided and evaluates the averaged color signal in the expanded area, in case of determining the averaged color signal in the plurality of areas are not respectively included within the white determining range by the second determination.

10. An image pickup apparatus comprising:

an image sensor; and a white balance adjusting device adapted to evaluate a color signal outputted from said image sensor and, perform a weighted correction of each value of the evaluated color signals corresponding to each white determining range to determine whether or not each value is available to adjust white balance and to adjust white balance on the basis of the corrected values, wherein said white balance adjusting device decreases a weighted-correction coefficient to the color signals according to increasing brightness of a field.

11. An image pickup apparatus according to claim 10, wherein said white balance adjusting device varies the weighted correction according to at least one of the brightness of a light source, degrees of effect of external light and flash light on an object and shutter speed.

12. An image pickup apparatus according to claim 1, wherein said white balance adjusting device varies a limiter on the high color temperature and the low color temperature side in order to make the white determining range narrow according to increasing the brightness of a field.

13. An image pickup apparatus comprising:

an image sensor; and a white balance adjusting device adapted to evaluate a color signal outputted from said image sensor in a value, determine whether or not each value of the evaluated color signal is included within a white determining range to regard the color signal corresponding to the included value as white, and adjust white balance on the basis of control signal obtained from the color signal corresponding to the value determined to be included within the changed white determining range, wherein said white balance adjusting device changes an area of the white determining range larger as a degrees of effect of flash light to an external light decreases.

14. An image processing method for processing an image sensed by an image sensor comprising the steps of:

evaluating a color signal outputted from said image sensor in value;

determining whether or not a the value of the evaluated color signal is included within a white determining range to regard the color signal corresponding to the included value as white;

changing an area of the white determining range smaller as a brightness of a field increases; and adjusting white balance on the basis of control signal obtained from the color signal corresponding to the value determined to be included within the changed white determining range.

15. An image processing method according to claim 14, wherein the white determining range causes to vary a limiter on a high color temperature side and a low color temperature side in order to be narrower according to increasing brightness of a field.

16. An image processing method according to claim 14, further comprising:

performing color conversion of the color signal which the white balance is adjusted by using a matrix; and selecting one of a plurality of matrixes to perform the color conversion by using the selected matrix according to color temperature of light source.

17. An image processing method according to claim 16, wherein the matrix is a matrix which performs the color conversion of Ma, G, Cy and Ye signals into R, G and B signals.

18. An image processing method for processing an image sensed by an image sensor comprising the steps of:

evaluating a color signal outputted from said image sensor;

determining whether or not each value of the evaluated color signal is included within a white determining range to regard the color signal corresponding the included value as white;

changing an area of the white determining range larger as a degrees of effect of flash light to an external light decreases; and adjusting white balance on the basis of control signal obtained from the color signal corresponding to the value determined to be included within the changed white determining range.

19. An image processing method according to claim 14, further comprising:

restoring signal obtained by addition read-out from said image sensor into a color signal in non-addition read-out in case the color signal is read out from said image sensor with addition read-out, wherein the color signal restored in non-addition read-out is determined.

20. An image processing method according to claim 14, further comprising:

restricting a frequency band of the color signal outputted from said image sensor by a low pass filter before adjusting the white balance.

21. An image processing method according to claim 14, further comprising:

performing color conversion of the color signal which the white balance is adjusted by using a matrix; and computing a color temperature of a light source on the basis of the color signal determined to be included within the white determining range, wherein the matrix is generated on the basis of the computed color temperature.

22. An image processing method for processing an image sensed by an image sensor comprising the steps of:

performing a first determination whether or not each value of color signals evaluated by a first evaluation is included within a white determining range;

performing a second determination to determine whether or not each value of averaged color signals, respectively, obtained by averaging color signals in a divided area of one picture and evaluated by a second evaluation is included within said white determining range;

obtaining a first control signal on the basis of the values determined to be included within said white determining range by said first determination;

obtaining a second control signal on the basis of the values determined to be included within said white determining range by said second determination;

obtaining a third control signal from the first and the second control signals according to a ratio of the number of sample points of the first color signal determined to be included within the white determining range and the number of sample points of the first color signal not included within the white determining range by the first determination; and adjusting white balance on the basis of the third control signal.

23. An image processing method according to claim 22, wherein in the second evaluation evaluates the color signal obtained from the greater number of pixel than the number of said first evaluation.

24. An image processing method according to claim 22, wherein, in case of determining that the color signal averaged by said second determination in a plurality of areas is not included within any one of the white determining ranges, expands the area in the second evaluation to be divided and evaluates the averaged color signal in the expanded areas.

25. An image processing method for processing an image sensed by an image sensor comprising the steps of:

evaluating color signals outputted from said image sensor;

performing weighted correction of each value of the evaluated color signals corresponding to each white determining range to determine whether or not each value is available to adjust white balance; and adjusting the white balance on the basis of the corrected values, wherein a weighted-correction coefficient to the color signals is decreased according to increasing brightness of a field.

26. An image processing method according to claim 25, wherein said weighted-correction coefficient varies according to at least one of the brightness of a light source, the degrees of effect of external light, flash light on an object and the shutter speed.

27. An image pickup apparatus according to claim 1, wherein said brightness of the object is characterized in being detected by at least one of shutter speed, F-number, or distance to the object.

28. An image processing method according to claim 14, wherein said brightness of the object is characterized in being detected by at least one of shutter speed, F-number, or distance to the object.

29. An image pickup apparatus comprising:

an image pickup device to produce color signals;

a white balance adjusting device adapted to adjust gains of said color signals according to a predetermined range of white component of said color signals, wherein said predetermined range varies according to the brightness of the object and is made smaller when the brightness of the object increases.

30. An image processing apparatus comprising:

an inputting device for inputting color signal;

a white detecting circuit for detecting white portion in a field, having a white detecting range to regard an output color signal from said inputting device as a white;

wherein said white detecting range is changed smaller when a brightness of the field is over a predetermined value.

31. An image processing apparatus according to claim 30, further comprising:

an image sensor;

wherein said inputting device inputs the color signal obtained by said image sensor.

32. An image processing apparatus according to claim 30, wherein said white balance detecting circuit converts the color signal inputted by said inputting device into a value before detecting white portion, and detects white portion by plotting on a predetermined coordinate system, and then white balance is controlled on the basis of control signal obtained from at least the value.

33. An image processing apparatus according to claim 30, further comprising:

a matrix converting device adapted to perform color conversion of the color signal by using a matrix;

wherein said matrix converting device has a plurality of different matrixes, and selects one of said plurality of matrixes to perform color conversion by using the selected matrix, according to a color temperature of light source which is computed on basis of the white portion detected by said white balance detecting device detects.

34. An image processing apparatus according to claim 30, further comprising:

wherein said white balance detecting range is changed an area of the white determining range larger as a degree of effect of flash light to an external light decreases.

35. An image processing method for processing an image picked up by an image sensor comprising:

inputting a color signal;

detecting white portion in a field, having a white detecting range to regard an output color signal from said inputting device as white;

wherein said white detecting range is changed smaller when a brightness of the field is over a predetermined value.

* * * * *